United States Patent
Carbone et al.

(10) Patent No.: US 12,193,605 B2
(45) Date of Patent: Jan. 14, 2025

(54) SANDWICH PRESS FOR TOASTER

(71) Applicant: Revolution Cooking, LLC, Potomac, MD (US)

(72) Inventors: Philip C. Carbone, North Reading, MA (US); James Poon, Woburn, MA (US); Ryan O'Donnell, Ipswich, MA (US); Robie Helm, Melrose, MA (US); Cody O'Sullivan, London (GB); Eric Hyp, Guangzhou (CN)

(73) Assignee: Revolution Cooking, LLC, Potomac, MD (US)

( * ) Notice: Subject to any disclaimer, the term of this patent is extended or adjusted under 35 U.S.C. 154(b) by 0 days.

(21) Appl. No.: 18/423,433

(22) Filed: Jan. 26, 2024

(65) Prior Publication Data

US 2024/0156303 A1 May 16, 2024

Related U.S. Application Data

(63) Continuation of application No. 17/195,806, filed on Mar. 9, 2021, now Pat. No. 11,930,961.

(51) Int. Cl.
*A47J 37/08* (2006.01)

(52) U.S. Cl.
CPC ....... *A47J 37/0885* (2013.01); *A47J 37/0857* (2013.01)

(58) Field of Classification Search
CPC .... A47J 37/06; A47J 37/0611; A47J 37/0635; A47J 37/067; A47J 37/0688; A47J 37/0694; A47J 37/0786; A47J 37/08; A47J 37/0807; A47J 37/0857; A47J 37/0871; A47J 37/0885; A47J 37/0892
See application file for complete search history.

(56) References Cited

U.S. PATENT DOCUMENTS

| | | | |
|---|---|---|---|
| 264,867 | A | 9/1882 | Ege |
| 1,155,838 | A | 10/1915 | Rose |
| 1,706,516 | A | 3/1929 | Bennett |
| 1,733,137 | A | 10/1929 | Spang |

(Continued)

FOREIGN PATENT DOCUMENTS

| | | |
|---|---|---|
| EP | 0 126 663 A1 | 11/1984 |
| RU | 198 135 U1 | 6/2020 |
| WO | WO 2016/068567 A1 | 5/2016 |

OTHER PUBLICATIONS

Invitation to Pay Additional Fees mailed Jul. 4, 2022 for International Application No. PCT/US2022/018989.

(Continued)

*Primary Examiner* — Hung D Nguyen
(74) *Attorney, Agent, or Firm* — Wolf, Greenfield & Sacks, P.C.

(57) ABSTRACT

A sandwich press or food holder for use with a cooking appliance, such as a toaster or oven. Sidewalls of the press that define a space in which a food item is received can have one or more ridges that define a convex surface inside the cavity and a concave surface on an exterior of the sidewall. The concave surface can be positioned adjacent a heating element when the press is received in a cooking cavity of the appliance. One or more openings can be provided in the sidewall, e.g., to allow radiant energy to pass and/or steam to escape. A handle can permit two-handed manipulation of the press and can have a gripping portion that is offset from an area directly above the press.

20 Claims, 9 Drawing Sheets

(56) References Cited

U.S. PATENT DOCUMENTS

| | | |
|---|---|---|
| 1,978,735 A | 10/1934 | Bemis |
| 2,028,159 A | 1/1936 | Kemp |
| 2,849,947 A | 9/1958 | Bork |
| 2,941,463 A | 6/1960 | Di Cuia |
| 3,524,404 A | 8/1970 | Kimura et al. |
| 4,184,419 A | 1/1980 | Ponte |
| 5,129,313 A | 7/1992 | Coppier |
| 8,240,246 B2 | 8/2012 | Davis |
| 11,930,961 B2 | 3/2024 | Carbone et al. |
| 2007/0029316 A1 | 2/2007 | Fernandez |
| 2017/0367538 A1 | 12/2017 | Stojanovski |
| 2019/0167036 A1 | 6/2019 | Pool, III et al. |
| 2021/0378445 A1 | 12/2021 | Nandoliya et al. |
| 2022/0287509 A1 | 9/2022 | Carbone et al. |
| 2022/0287510 A1 | 9/2022 | Johnson |

OTHER PUBLICATIONS

International Search Report and Written Opinion mailed Aug. 25, 2022 for International Application No. PCT/US2022/018989.
International Preliminary Report on Patentability mailed Sep. 21, 2023 for International Application No. PCT/US2022/018989.

SANDWICH PRESS FOR TOASTER

RELATED APPLICATIONS

This Application is a Continuation of U.S. application Ser. No. 17/195,806, filed Mar. 9, 2021, entitled "SANDWICH PRESS FOR TOASTER".

BACKGROUND

Toasters are widely known for toasting or otherwise heating bread and other food products. Some toasters are arranged with one or more vertical slots or cavities into which bread or other food product is received. Heating elements on opposite sides of the vertical cavity operate to heat the food product, after which the food product is removed from the cavity, e.g., by a lift arm moving the food product upwardly at least partially out of the cavity. This allows a user to grasp the food product for removal.

SUMMARY

In some aspects of the disclosure, a sandwich press is described that can be used with a toaster or other cooking appliance. For example, a sandwich or other food item can be provided in a space of the sandwich press, e.g., between sidewalls of the press, and the press inserted into a vertical cooking cavity of a toaster for heating the sandwich.

In some embodiments, a sandwich press can be configured for use with a toaster having a vertical cavity to receive and heat a food item and a plurality of heating elements associated with the vertical cavity. The press can include first and second sidewalls that are spaced apart from each other and define a space between the sidewalls to receive the food item. At least one of the first and second sidewalls can have a plurality of ridges that extend inwardly from an inner side of the sidewall into the space and/or a plurality of openings that extend through the sidewall. Each of the ridges can define a concave shape at an outer side of the first or second sidewall and/or a convex shape at an inner side of the first or second sidewall. In some cases, the first and second sidewalls each have a plurality of ridges that extend along and inwardly from the sidewall into the space and a plurality of openings that extend through the sidewall and are positioned between adjacent ridges. The first and second sidewalls can be coupled together and configured for insertion into the vertical cavity of the toaster to heat the food item in the space between the sidewalls. In some embodiments, the first and/or second sidewall can have a stop extending outwardly from a top end configured to resist movement of the sandwich press into the vertical cavity beyond the stops. This can help prevent the press from moving beyond a desired distance into the cooking cavity and/or help properly position the press in the cooking cavity.

In some embodiments, a plurality of ridges and a plurality of openings extend along a direction from a top to a bottom of the first and second sidewalls. Each of the plurality of ridges can define an elongated convex shape at an inner side of the first and second sidewalls and define an elongated concave shape at an outer side of the first and second sidewalls. The concave shape of one or more ridges can be configured to be positioned adjacent a heating element in the cooking cavity, e.g., to receive a portion of the heating element if the heating element expands or otherwise moves during the cooking process and/or to receive and transfer heat from the heating element to the food item. In some cases, the plurality of ridges can be configured to transfer a greater amount of heat or transmit heat at a faster rate or spread heat delivery over a larger surface area to the space and the food item than a flat sidewall surface located in a same place on the sidewall as the ridge. Each of the openings can define an elongated slot, e.g., that extends in a direction of adjacent ridges. In some cases, the plurality of openings can be configured to permit steam emitted by the food item to escape the space. In some embodiments, each of the plurality of ridges has a larger surface area than an area of each of the plurality of openings. In some cases, the plurality of openings collectively define an open area of the first or second sidewall, and a ratio of the open area to a closed area of the first or second sidewall can be between zero and 40%.

In some cases, the press can be opened and closed to permit placement or removal of a food item into the press. For example, the first and second sidewalls can each have a top end and a bottom end, and the first and second sidewalls can be coupled together at the bottom ends, e.g., by a hinge configured to permit movement of the first and second sidewalls relative to each other between an open position and a closed position. In some cases, the press can include a latch arranged to hold the first and second sidewalls in the closed position and configured to be released to allow movement of the sidewalls to the open position.

In some embodiments, the bottom ends of the first and second sidewalls are configured to enclose the space between the first and second sidewalls at a bottom of the space, e.g., to capture grease or other materials that fall from the food item. In some cases, the press includes lateral end walls attached to at least one of the first and second sidewalls. The lateral end walls can be configured to enclose the space between the first and second sidewalls at lateral ends of the space. Thus, the space defined by the press can be enclosed at a bottom and/or lateral ends of the sidewalls. In some cases, the first and second sidewalls can be configured to define an entrance opening to the space at a top of the space, e.g., to allow a food item to be dropped into the space through the opening.

In some embodiments, the sandwich press can include a handle extending from the top end of the first or second sidewall. The handle can be configured to permit grasping by hand to manipulate the sandwich press at a location on the handle that is positioned between the lateral ends, above the space and offset from a region between planes of the first and second sidewalls. Such positioning can locate a gripping portion of the handle away from a front of a cooking device (e.g., where a user interface is located) and/or away from heat that rises from a cooking cavity during use of the press. In some cases, such as where the first and second sidewalls are coupled together by a hinge configured to permit movement of the first and second sidewalls relative to each other between an open position and a closed position, the handle can include a first portion coupled to the first sidewall and a second portion coupled to the second sidewall. The first and second portions can allow a user to grasp the portions in respective hands for manipulation of the press between open and closed positions. In some cases, the first portion can be movably mounted to the first sidewall and configured to engage with the second portion, e.g., by way of a latch, to hold the first and second sidewalls in the closed position.

In some embodiments, a sandwich press can be configured for use with a toaster having a vertical cavity to receive and heat a food item and a plurality of heating elements associated with the vertical cavity. The press can have first and second sidewalls that are spaced apart from each other and define a space between the sidewalls to receive a food item. The first and second sidewalls can be coupled together and configured for insertion into the vertical cavity to heat the food item in the space between the first and second sidewalls. As an example, the first and second sidewalls can each having a top end, a bottom end and opposed first and second lateral ends. A handle can extend from the top end of the first or second sidewall, and can be configured to permit grasping by hand to manipulate the sandwich press at a location on the handle that is positioned between the lateral ends, above the space and offset from a region between planes of the first and second sidewalls. This arrangement of the handle can help position a gripping portion of the handle away from an area of the toaster that includes a user interface and/or away from an area where heat from the toaster can excessively warm the gripping portion.

Such a press can include any suitable features such as those mentioned above or elsewhere herein. For example, the bottom ends of the first and second sidewalls can be coupled together by a hinge configured to permit movement of the first and second sidewalls relative to each other between an open position and a closed position. The handle can include a first handle portion coupled to the first sidewall and a second handle portion coupled to the second sidewall, and the first and second handle portions can be configured to permit two-handed manipulation of the first and second sidewalls between the open and closed positions, e.g., to place a food item in or remove a food item from the press. In some embodiments, a retainer can be provided to hold the first and second handle portions adjacent each other so as to hold the press in a closed position. In some cases, the first handle portion can be movably mounted to the first sidewall and configured to engage with the second handle portion to hold the first and second sidewalls in the closed position. As an example, the second handle portion can include a catch and the first handle portion can include a lever configured to engage with the catch and force the first and second sidewalls to move to the closed position with pivotal movement of the first handle portion relative to the first sidewall. This arrangement can provide a user with a mechanical advantage in closing the press, e.g., to overcome resistance of a food item that is squeezed between the sidewalls in the space.

In some embodiments, the handle can include a first handle portion with a U-shape having first and second legs and a central portion extending between the first and second legs. The first and second legs can be attached respectively to first and second lateral ends of the first sidewall. In some cases, the first and second legs of the first handle portion can be pivotally attached to the first and second lateral ends. The handle can include a second handle portion with a U-shape having first and second legs and a central portion extending between the first and second legs. The first and second legs can be fixed respectively to first and second lateral ends of the second sidewall. In some embodiments, one or both of the first and second legs of the second handle portion can include a catch, and a part of the first handle portion can be configured to engage with the catch of the first and/or second legs of the second handle portion and to force the first and second sidewalls to move to the closed position in response to movement of the central portion of the first handle portion toward the central portion of the second handle portion. For example, a distal end of a lever portion of the first handle portion can be configured to engage with a corresponding catch of the second handle portion and cause the sidewalls to move to the closed position in response to movement of the first handle portion relative to the second handle portion.

Again, a press including a handle configured in any of the ways above can include any suitable features such as those mentioned above or elsewhere herein. For example, the press can have one or more ridges that extend inwardly from an inner side of the first and/or second sidewall and/or one or more openings that extend through the first and or second sidewall. Such ridges and/or openings can be configured in any way described above or otherwise herein. Other features or components can equally be provided or not with the press having a handle.

In some embodiments, a sandwich press can be configured for use with a toaster having a vertical cavity to receive and heat a food item and a plurality of heating elements associated with the vertical cavity. The press can include first and second sidewalls that are spaced apart from each other and define a space between the first and second sidewalls to receive a food item. As an example, the first and second sidewalls can each have a top end, a bottom end and opposed first and second lateral ends. Bottom ends of the first and second sidewalls can be coupled together to permit movement of the first and second sidewalls relative to each other between an open position and a closed position. The first and second sidewalls can be configured, when in the closed position, for insertion into the vertical cavity to heat the food item in the space between the first and second sidewalls. In some embodiments, the press can include a cam latch having a first portion attached, e.g., pivotally, to the first sidewall and configured to force the first and second sidewalls to move to the closed position and compress the food item in the space in response to movement of the first portion relative to the first sidewall. In some cases, the cam latch can include a second portion attached to the second sidewall and configured to engage the first portion. For example, the second portion can include a catch and the first portion can include a lever having a distal end configured to engage the catch and force the first and second sidewalls to move to the closed position in response to movement of the first portion relative to the first sidewall. The first portion can be manipulated by hand by a user to clamp or otherwise force the press to the closed position.

In some cases, the press can include a retainer configured to hold the first and second portions of the latch stationary relative to each other when the first and second sidewalls are in the closed position. The retainer can thus hold the first and second portions and the sidewalls of the press in a closed position. In some embodiments, the retainer can include a magnet mounted to the first or second portion and configured to exert force on the other of the first or second portion to hold the first and second portions stationary.

In some cases, one or more portions of the latch can be incorporated into a portion of a handle or other part of the press. For example, the first portion of the cam latch, such as a lever, can be a part of the handle, such as a first handle portion coupled to the first sidewall. A second portion of the latch, such as a catch, can be arranged as part of a second handle portion coupled to the second sidewall. In some cases, the first and second handle portions can be configured to permit two-handed manipulation of the first and second sidewalls between the open and closed positions. In this arrangement, manipulation of the first and/or second handle portion can operate the latch and thus force the press to move to a closed position.

A press including a latch can include any suitable features such as those mentioned above or elsewhere herein. For example, the press can include a handle, such as with first and/or second handle portions having any of the features described above or otherwise herein. The first and/or second sidewalls can have ridges and/or opening and/or any other suitable features as described herein. Other features or components described can be employed with the press as well and are not repeated for brevity.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

DETAILED DESCRIPTION

Figure 1:
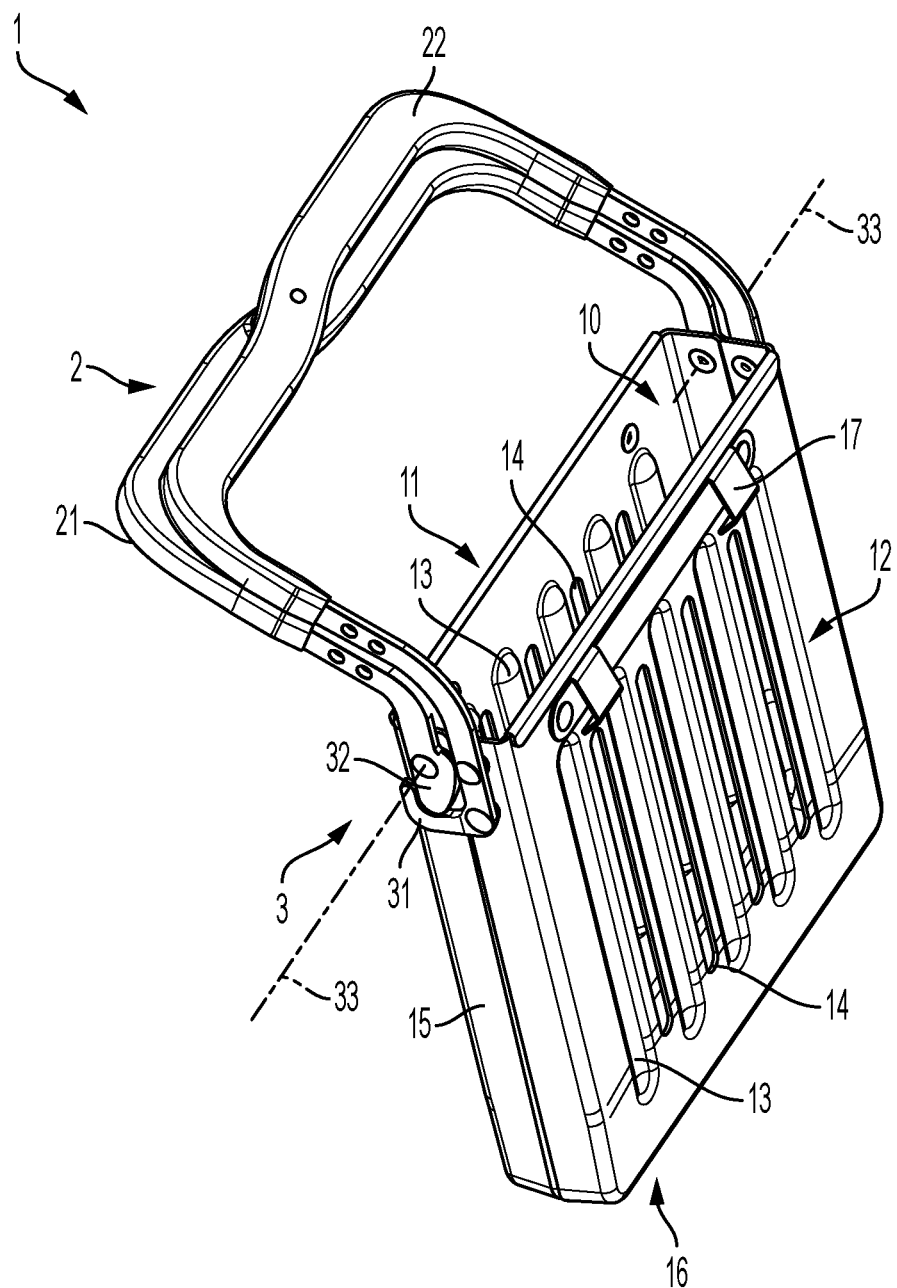
FIG. 1 is a front left perspective view of a sandwich press for use with a toaster in an illustrative embodiment.

Various embodiments will be described in detail with reference to the drawings, wherein like reference numerals represent like parts and assemblies. Reference to various embodiments does not limit the scope of the claims. Additionally, any examples set forth in this specification are not intended to be limiting and merely set forth some of the many possible embodiments for the claims. Aspects of the disclosure can be used individually and/or in any suitable combination with each other. For example, a sandwich press is described having one or more sidewalls with one or more ridges that define a convex surface at an interior of the sidewall. A press is also described having a two-part handle that permits manipulation of the press sidewalls between open and closed positions. A press is also described having a latch that holds the sidewalls in a closed position. These features can be used alone in a press, or can be combined together in any suitable way. For example, a press having a sidewall with ridges and a two-part handle can be provided without a latch. Or a press having a sidewall with ridges and a latch, but no handle can be provided. Alternately, a press with a two-part handle and latch can be employed together but no ridges are provided with sidewalls of the press.

Figure 2:
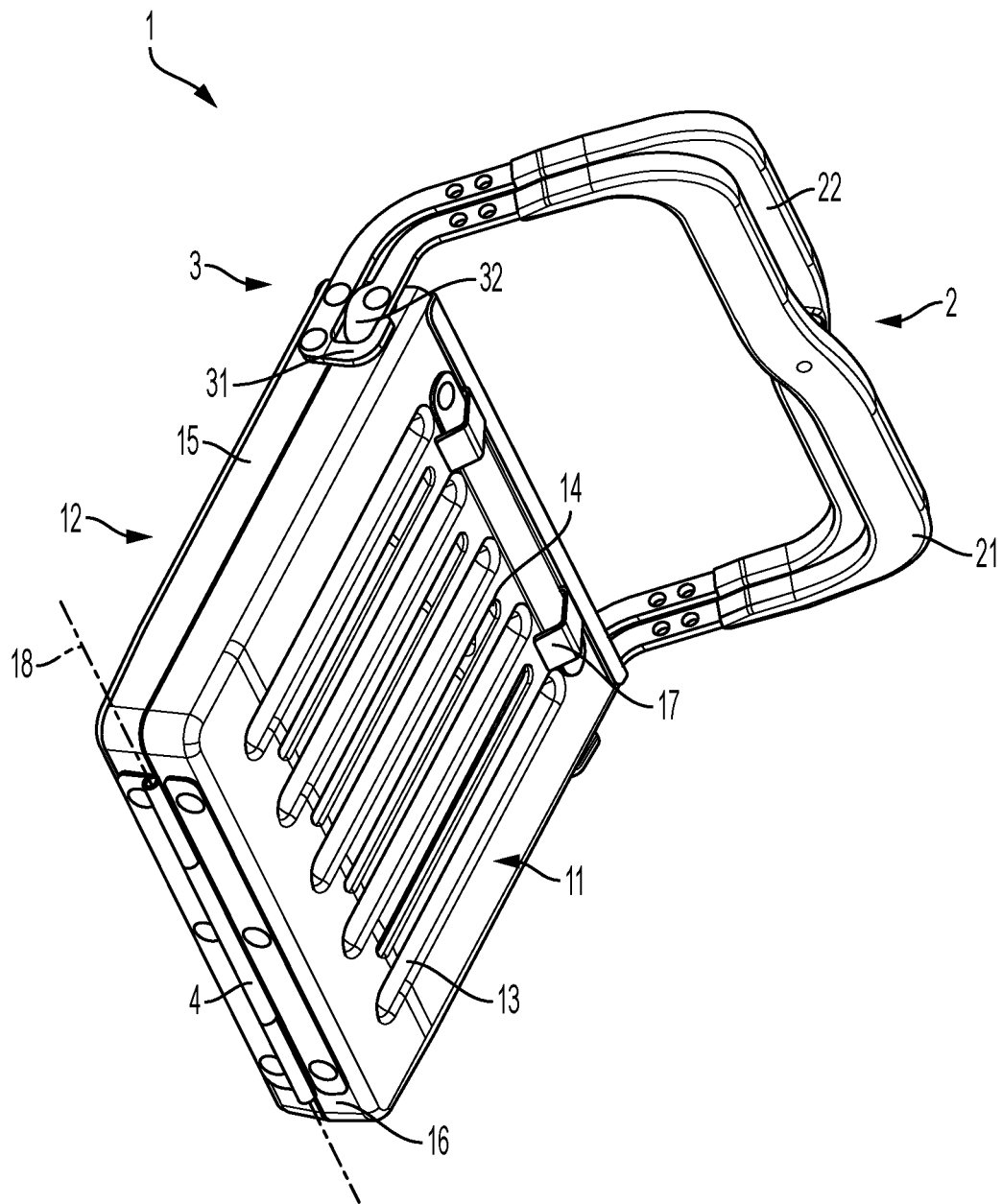
FIG. 2 is a rear right perspective view of the FIG. 1 embodiment.
Figure 8:
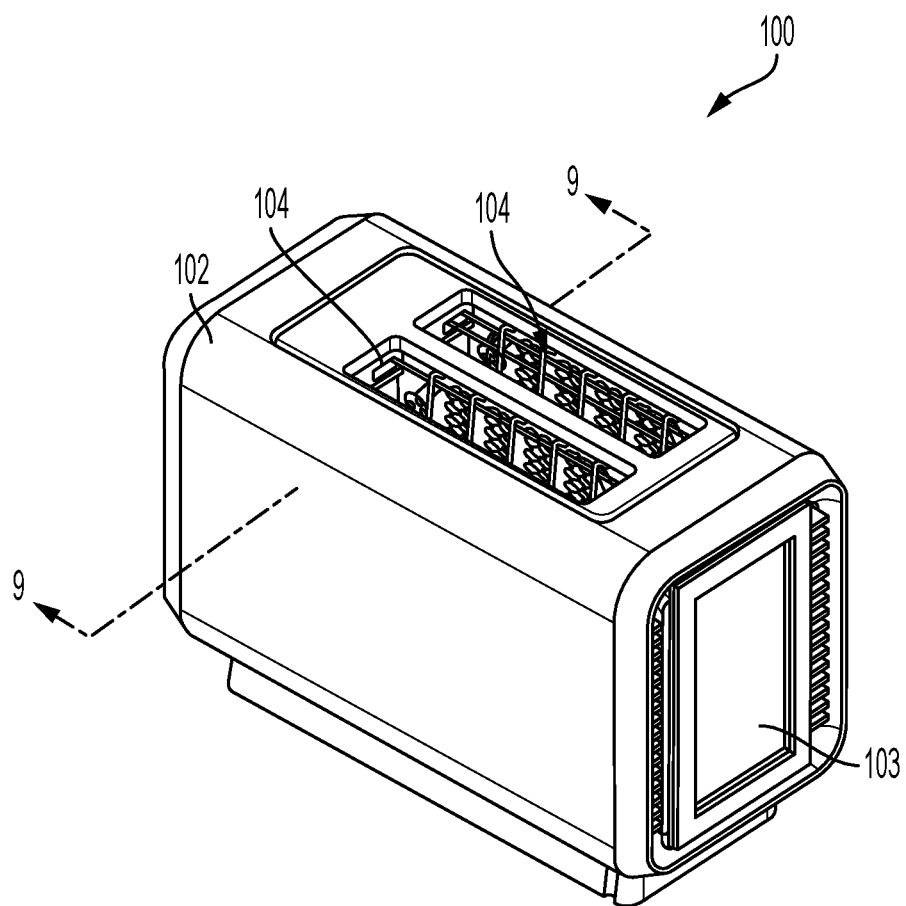
FIG. 8 is a toaster with which the FIG. 1 sandwich press can be used by inserting the press into a cooking cavity of the toaster.
Figure 9:
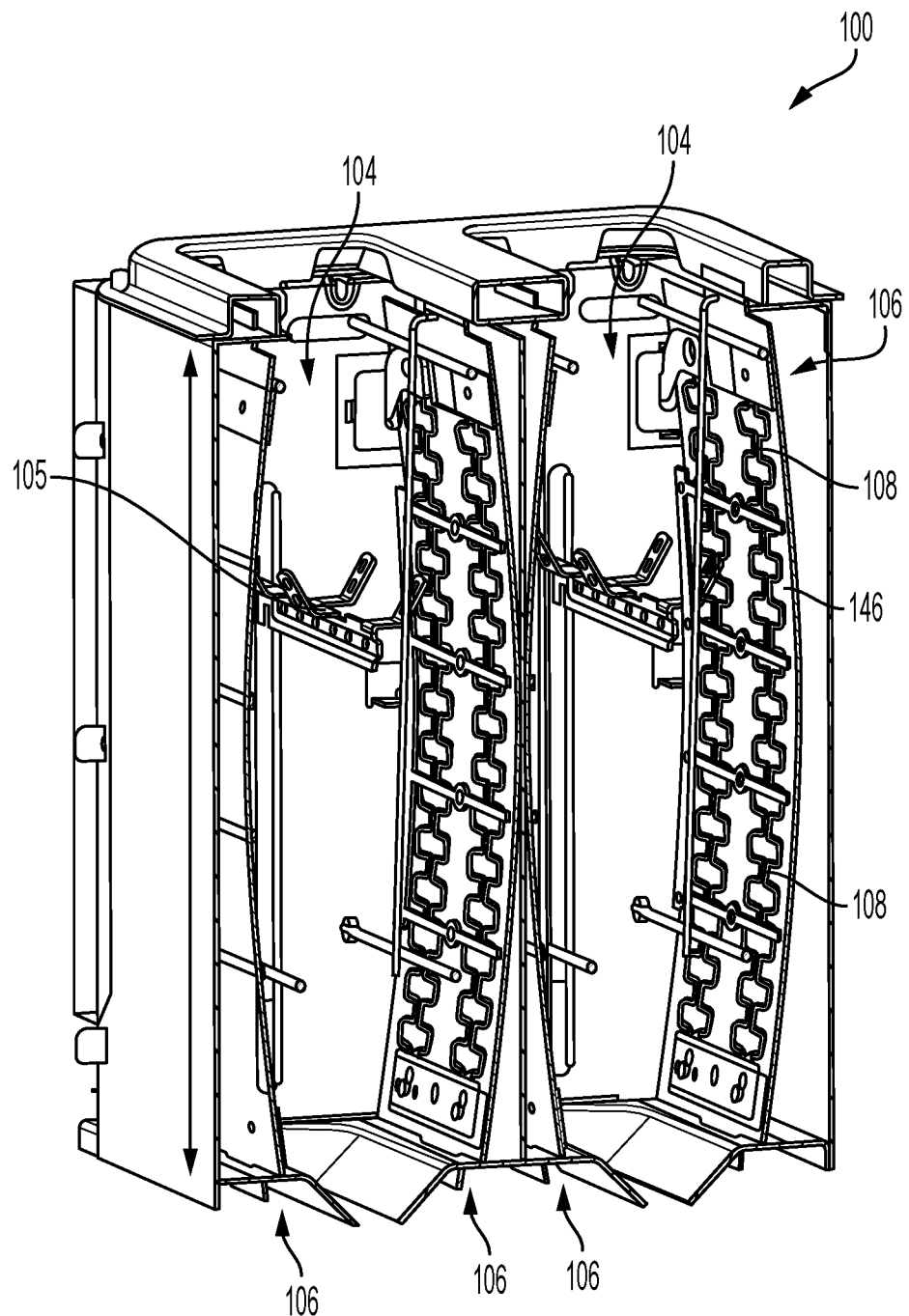
FIG. 9 is a cross sectional view of the FIG. 8 toaster along the line 9-9 in FIG. 8.

FIGS. 1 and 2 show an illustrative embodiment of a sandwich press 1 that is configured for use with a toaster, e.g., having a vertical slot or cavity that typically receives a piece of bread or other food item for toasting or otherwise heating the food item. In the case of a sandwich press 1 like that in FIGS. 1 and 2, a food item such as a sandwich can be placed in the press 1 and the press 1 positioned in the cooking cavity of the toaster for heating. One such toaster 100 is shown in FIGS. 8 and 9 and has a pair of cooking cavities 104 to receive a food item alone or to receive a sandwich press 1 for heating an item held by the press 1. As will be appreciated by those of skill in the art, a food item heated in the press 1 can experience various cooking processes such as toasting, broiling, drying, roasting, etc., all of which are referred to herein as cooking or heating. Also, although the various embodiments of a press 1 discussed herein are described with reference to a "sandwich," aspects of the disclosure related to a sandwich press are not limited to use with any particular food item, such as a sandwich. Likewise, while the term "press" may suggest that a food item is squeezed or compressed when held by the press, but such squeezing or compression is not required. Thus, a sandwich press can receive non-sandwich food items, such as a meat patty or bread item, and/or the food items can be held loosely and without compression by the sandwich press. FIGS. 8 and 9 show an illustrative toaster 100 that has a vertical cooking cavity 104 that can receive the sandwich press 1. The toaster 100 in this example includes a housing 102 with a user interface 103 at a front side of the housing 102 and openings at an upper surface of the housing 102 that lead to the cooking cavities 104, as is commonly found in toasters. The cooking cavities 104 each have heating element assemblies 106 that provide heat, e.g., in the form of radiant energy, to items in the cooking cavity 104. The heating element assemblies 106 in this illustrative arrangement include a support 146 that supports one or more heating elements 108 which emit radiant energy when an electrical current is passed through the element 108. The elements 108 are oriented to extend vertically in the cooking cavity 104, which is relevant to features of the illustrative press 1 described below. That is, as detailed below, a press can have ridges that present a concave surface toward a corresponding heating element 108, and thus the ridges may be sized, shaped and oriented in a way that corresponds or otherwise functions with heating elements 108 of a toaster. Each cooking cavity 104 can have a lift arm 105 that supports a food item or press 1 received in the cooking cavity 104 and can be movable to lower and/or lift an item with respect to the cavity 104. However, it should be understood that sandwich press arrangements discussed herein are not limited to use with any particular toaster, such as the one shown in FIGS. 8 and 9, and/or with cooking appliances having vertical cooking cavities, and/or with cooking cavities having heating elements arranged in any particular way. Instead, a sandwich press can be configured for use with any cooking appliance, such as toaster ovens, grills, etc., may be provided into a cooking cavity in a horizontal or other direction as opposed to vertical, and may be used with cooking cavities having any suitable heating element or other configuration.

In some aspects of the disclosure, a sandwich press can have first and second sidewalls that are spaced apart from each other and define a space between the sidewalls to receive a food item. As an example, an opening to the space can be provided at an upper end of the sidewalls to receive a food item and/or the sidewalls can be moveable relative to each other between a closed position and an open position to allow access to the space and to at least partially enclose the food item in the space. One or both of the sidewalls can have a plurality of ridges that extend inwardly from an inner side of the sidewall into the space where the food item is located. In some embodiments, the ridges can each be configured to present a convex surface at the inner side of the sidewall and a concave surface at an outer side of the sidewall. In some cases, one or both sidewalls can have a plurality of openings that extend through the sidewall, e.g., openings in the sidewall can be positioned between adjacent ridges. The ridges can provide various functions in addition to providing a raised surface in the space between the sidewalls to exert force on a food item in the space. For example, when a press is received in a cooking cavity of a toaster, the ridges can be configured to be positioned adjacent a heating element in the cooking cavity and so receive radiant, conductive and/or convective heat from the heating element. As an example, a ridge can be configured to define an elongated convex surface at an inner side of a sidewall and a concave surface at an outer side of the sidewall. A heating element, e.g., of a toaster, can extend along the concave surface of the ridge when the sandwich press is received in the cooking cavity and provide heat to the concave surface of the ridge. Since the concave surface provides an increased or larger surface area to receive heat from the heating element as compared to a flat surface, the concave surface can receive and transmit a greater amount of heat or transmit heat at a faster rate or spread heat delivery over a larger surface area to the space and the food item than a flat surface. This can allow the sandwich press to heat a food item faster and/or otherwise more effectively. Another possible advantage is that if a heating element thermally expands or otherwise moves so that the heating element moves closer to the press during a cooking operation, a concave surface of the ridge that faces the heating element can provide an area into which the expanding heating element can move without contacting the press sidewall. As will be understood, contact between a heating element and a press may be undesirable, e.g., because an electrical short circuit may be created and/or heat may be transferred from the element to the press in the contacting area faster or to a greater extent than is desirable. Thus, ridges can provide an area at an external or outer side of the sidewall to receive a portion of a heating element and/or in which a heating element can move while minimizing chances that the heating element will directly contact the sidewall.

In some cases, the ridges can be made closed, i.e., have no openings through the sidewall, and of a thermally conductive material. Where the ridges are positioned adjacent a heating element in a cooking cavity, this configuration can allow the ridges to spread heat more evenly over the interior convex surface of the ridge and to a food item than a similarly sized opening or flat sidewall surface. Another potential feature provided by the ridges is to provide areas between the sidewall and the food item where the sidewall does not contact the food item or contacts the food item with less force or surface area. This can allow steam, grease or other items to flow more easily between the food item and the sidewall in the interior space of the press. In the case of steam, it may be desirable to allow steam to escape the space where the food item is located, e.g., through a top opening of the space, and reduced contact areas between adjacent ridges may provide an escape path. In embodiments where openings are provided between adjacent ridges, the reduced or non-contact areas near ridges can provide a path for steam and/or other materials to escape from the space through the openings.

In some embodiments, one or both sidewalls of the press can be relatively closed, e.g., have a ratio of open area to total surface area of the sidewall that is zero to 40%, e.g., zero to 20%. This is in contrast to food holding devices that employ a wire cage or mesh to hold a food item. A wire cage or mesh has a relatively large ratio of open area to total surface area and so allows steam, grease and other materials to easily escape from a food item as well as allow radiant heat to travel directly from a heating element to the food item. Either or both of these features may be undesirable, e.g., because readily escaping steam may allow a food item to dry out and some portions of the food item may receive too much heat or be heated too quickly in relation to other areas because a heating element can direct radiant heat to some food item areas but not others. In contrast, a sandwich press that has a reduced open area can control steam and other material escape as well as better control how heat is transferred to the food item.

Figure 3:
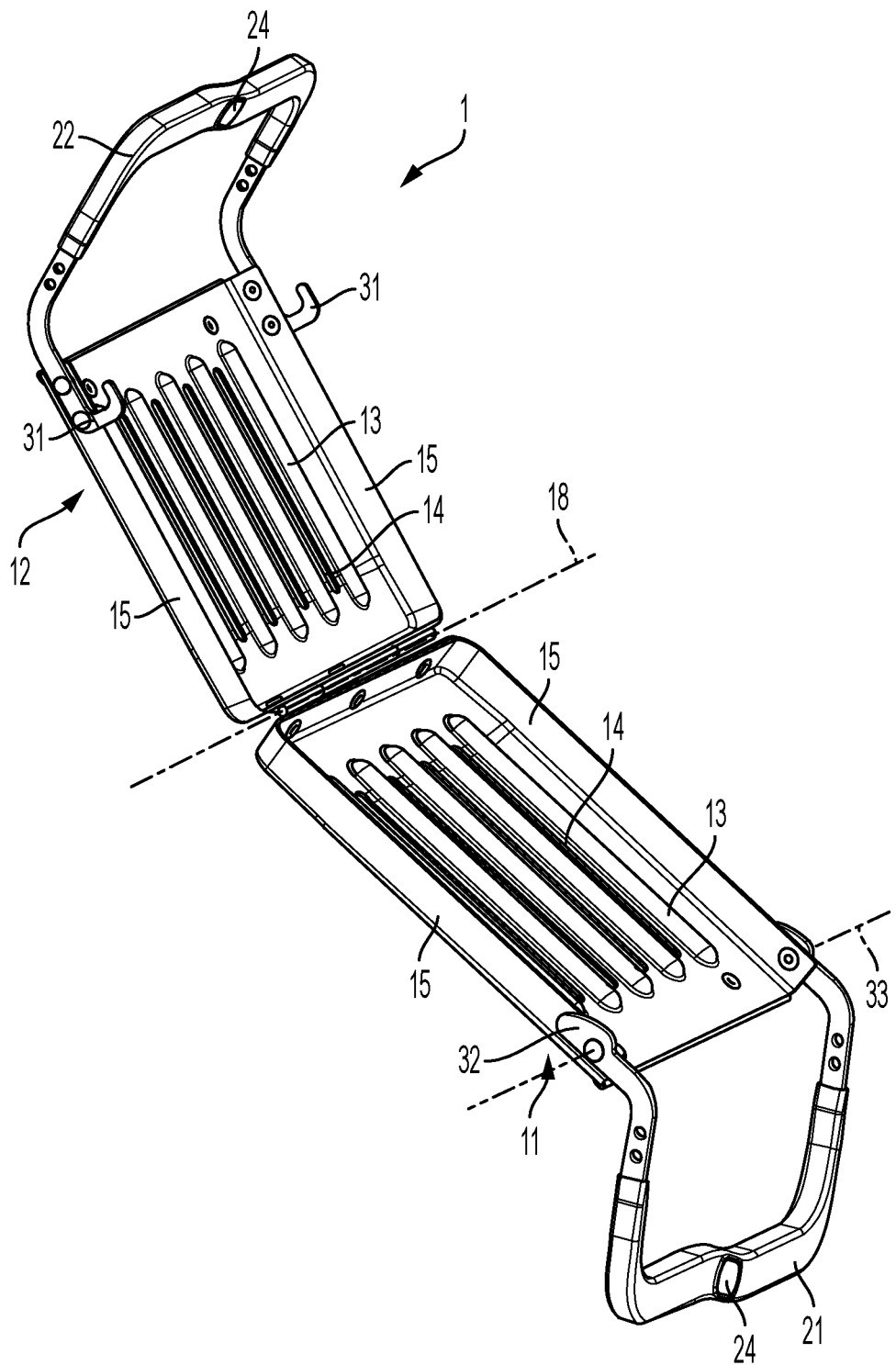
FIG. 3 is a perspective view of the FIG. 1 embodiment in an open position to receive a food item.

As noted above, the press 1 shown in FIGS. 1 and 2 includes one or more of the features described above. That is, the sandwich press 1 in some embodiments includes first and second sidewalls 11, 12 that are spaced apart from each other and define a space between the sidewalls 11, 12 to receive a food item. The sidewalls 11, 12 can be arranged to provide an opening 10 to the space at an upper end of the sidewalls 11, 12 to receive a food item, although in some cases the space can be enclosed at an upper end of the sidewalls 11, 12, e.g., by upper wall portions that extend inwardly from an upper end of a sidewall toward the opposing sidewall. In some embodiments, the sidewalls 11, 12 can be moveable relative to each other between an open position to allow access to the space and a closed position to at least partially enclose the food item in the space. For example, the sidewalls 11, 12 can be coupled by a hinge 4 at a bottom 16 of the press 1 or in another location, such as at a lateral side or end wall 15 of the sidewalls 11, 12. As can be seen in FIG. 3, the hinge 4 can allow the sidewalls 11, 12 to be moved to an open position so that a food item can be placed on an inner surface of one of the sidewalls 11, 12 or otherwise provided in the opened space between the sidewalls 11, 12. The sidewalls 11, 12 can then be moved to the closed position, e.g., by pivoting the sidewalls 11, 12 relative to each other about the pivot axis 18 of the hinge 4. This can squeeze the food item between the sidewalls 11, 12 or otherwise position the food item in the space between the sidewalls 11, 12 for heating. Note that a hinge 4 coupling between the sidewalls 11, 12 is not required and the sidewalls 11, 12 can be coupled together in other ways. For example, the sidewalls 11, 12 can be configured to be completely separable from each other, and then positioned adjacent each other and joined, e.g., by one or more hooks, latches, clips, straps or other fasteners, in the closed position. Thus, the first and second sidewalls 11, 12 can be coupled together in any suitable way and configured for insertion into the vertical cavity of a toaster to heat the food item in the space between the sidewalls.

Figure 6:
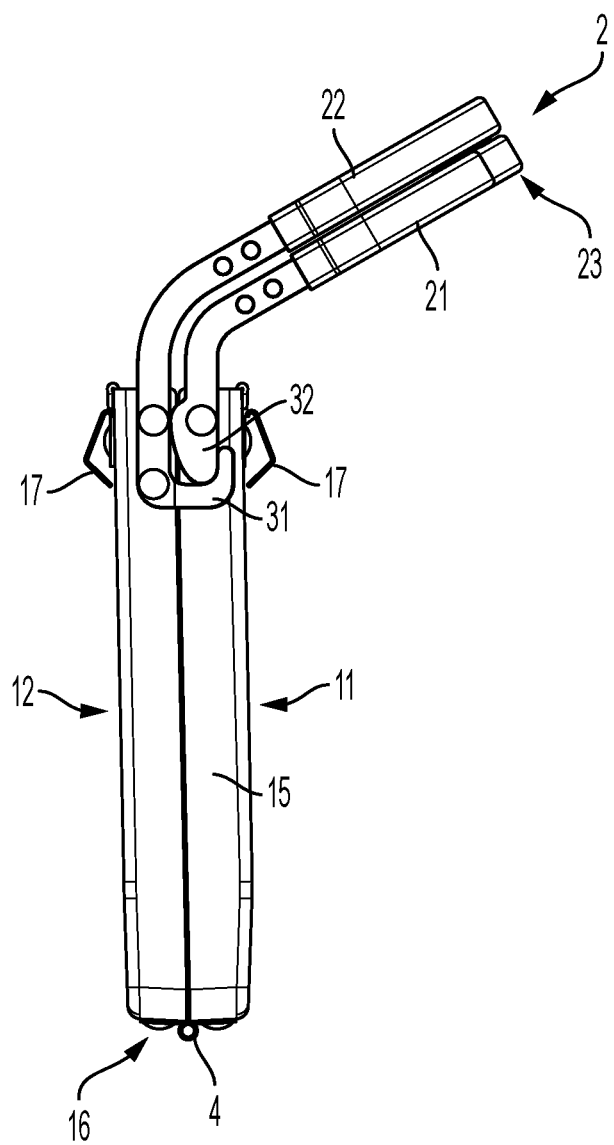
FIG. 6 is a right side view of the FIG. 1 embodiment.

In some embodiments, the press 1 can have one or more stops 17 or other features that are configured to limit a depth to which the press can be inserted into a cooking cavity or otherwise position the press 1 in a cooking cavity. For example, FIGS. 1 and 2 show stops 17 that extend outwardly from a top end of the sidewalls 11, 12 in a direction generally perpendicular to a plane of the sidewalls 11, 12. The stops 17 can be configured to define a width of the press 1 at the top end of the sidewalls 11, 12 that is larger than a width of a cooking cavity into which the press 1 is inserted, and so prevent the press 1 from being inserted into the cooking cavity beyond a desired distance. As an example, the stops 17 can define a width of the press 1 that is larger than a width of the opening that leads to a cooking cavity 104 of the toaster in FIG. 8. In some embodiments, the stops 17 can include sloped or angled surfaces, e.g., that taper outwardly and upwardly and/or that taper inwardly and upwardly relative to the sidewalls 11, 12. As can be seen in FIG. 6, the stops 17 in some embodiments include surfaces that taper outwardly and upwardly which are positioned below surfaces of the stop that taper inwardly and upwardly. The lower surfaces of the stops 17 that taper outwardly and upwardly can help center or otherwise suitably position the press 1 in a cooking cavity, e.g., because the tapered surfaces can contact upper edges of the opening to a cooking cavity and tend to center the press 1 relative to the upper edges of the cooking cavity. The upper surfaces of the stops 17 that taper inwardly and upwardly can allow the press 1 to be removed from a cooking cavity, e.g., if the lower surfaces of the stops 17 are inserted below the upper edge of the opening to the cooking cavity. The stops 17 can have a resilient or spring feature, e.g., at a connection to the sidewalls 11, 12 so that the stops 17 can move resiliently relative to the sidewalls 11, 12, e.g., toward and away from the sidewalls 11, 12. This can allow the stops 17 to provide a resilient force on the press 1 while held in the cooking cavity, e.g., to center or otherwise hold the press 1 in a desired way in the cooking cavity. For example, in some cases the press 1 and the stops 17 can be configured to be inserted through an opening and into the cooking cavity, e.g., below the upper edge or other entrance to the cooking cavity. The stops 17 can operate to contact inner walls of the cooking cavity to hold the press 1 in a desired way and a spring feature of the stops 17 can provide a compliant positioning of the press 1 in the cavity.

Figure 4:
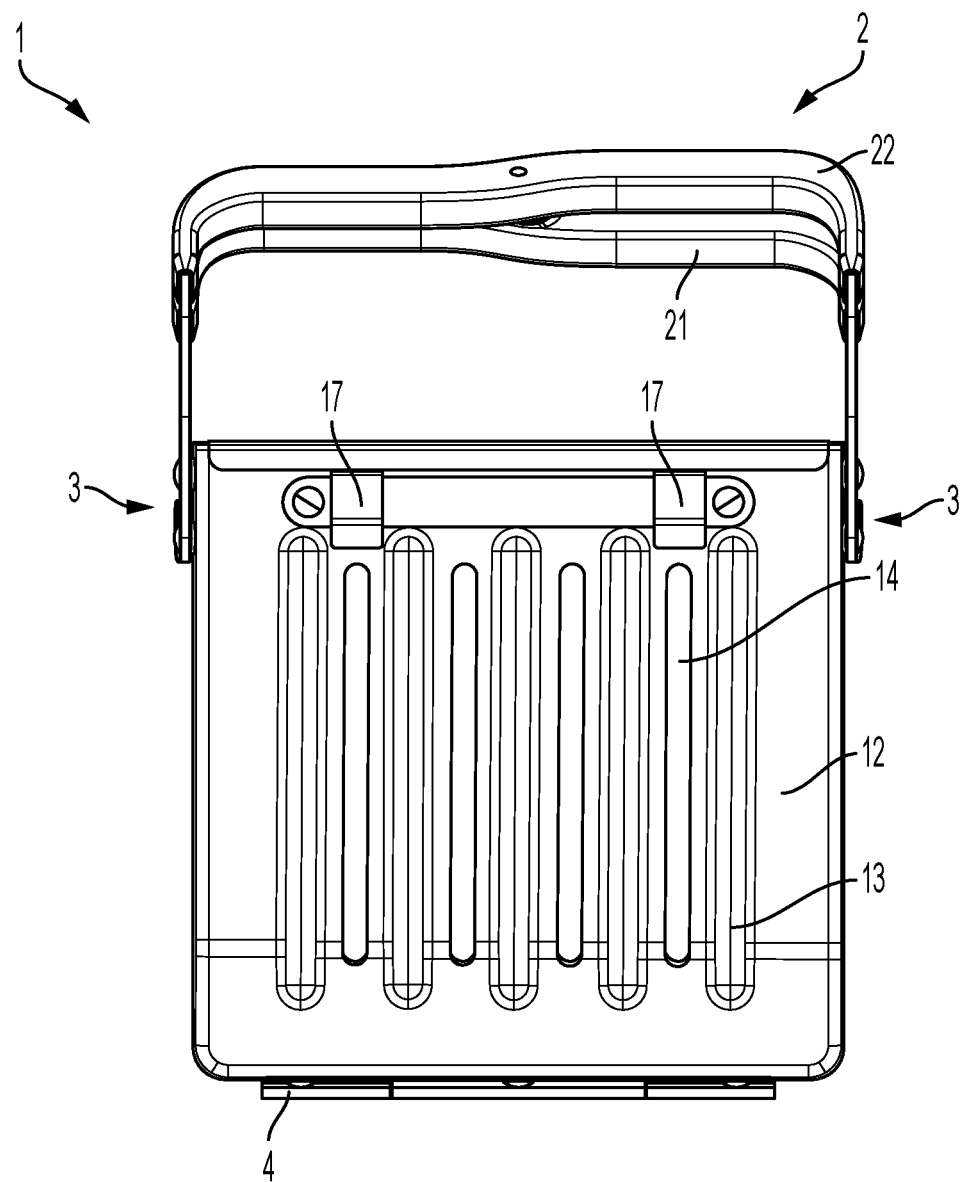
FIG. 4 is a front view of the FIG. 1 embodiment.
Figure 5:
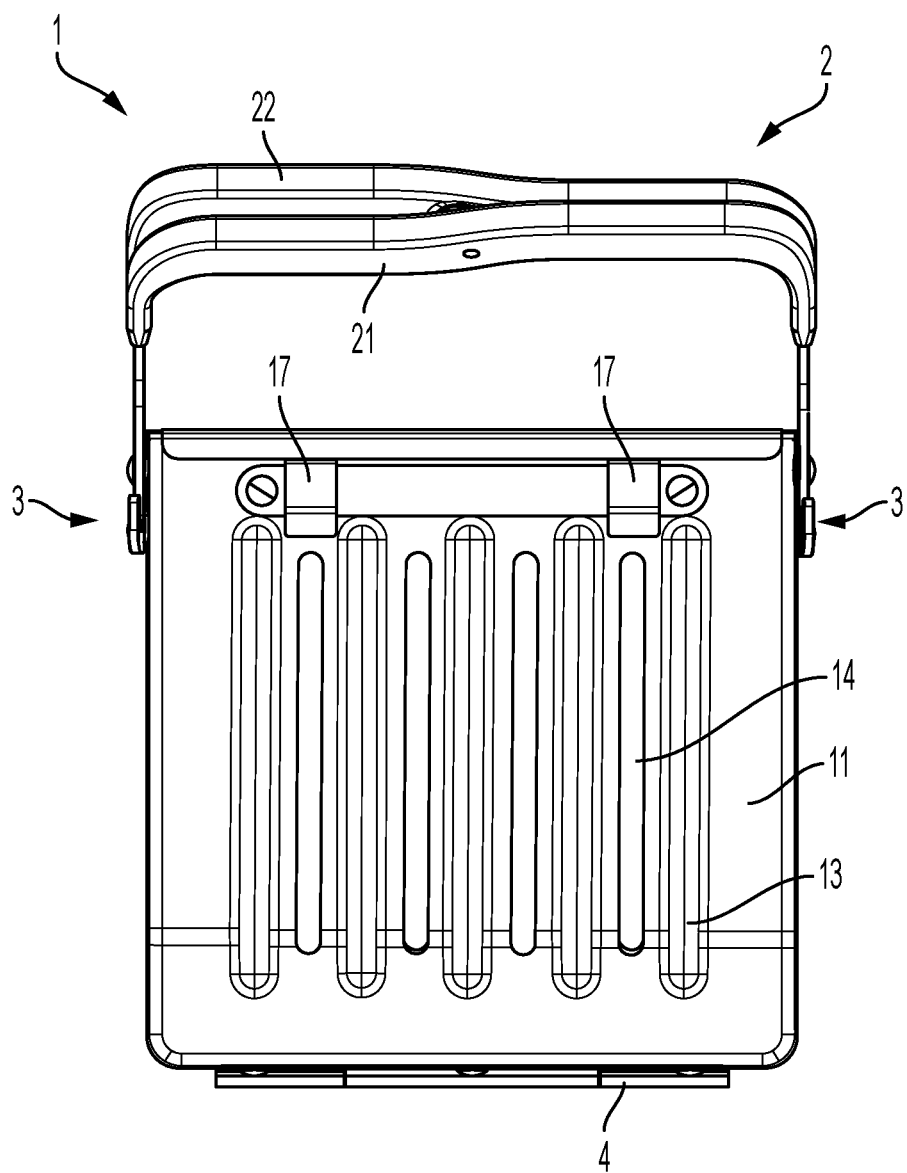
FIG. 5 is a rear view of the FIG. 1 embodiment.

One or both of the sidewalls 11, 12 can have a plurality of ridges 13 that extend inwardly from an inner side of the sidewall into the space where the food item is located. For example, the first and second sidewalls 11, 12 in FIGS. 1 and 2 have ridges 13 that extend along the inner surface of the sidewalls 11, 12 in a direction from the top to the bottom of the sidewalls 11, 12. As can be seen in FIGS. 4 and 5, openings 14 can be provided in the sidewalls 11, 12, e.g., between adjacent ridges 13 and extend in a same direction as the ridges 13. For example, the openings 14 can be arranged as elongated slots formed in the sidewalls 11, 12 that extend between adjacent ridges 13. As described above, the ridges 13 and/or openings 14 can be sized and/or shaped to provide desired heat transfer, venting and/or other features. For example, the openings 14 can be the only voids or holes in the sidewalls 11, 12 and can be arranged so that the sidewalls 11, 12 have a ratio of an open area to closed or total surface area of 40% or less, e.g., 30% or less, or 20% or less, or 10% or less. The ridges 13 can be formed by concave depressions in the outer surface of the sidewalls 11, 12 and convex portions at the inner surface of the sidewalls 11, 12. The concave/convex features can have any suitable shape, such as semi-circular, elliptical, or other in cross section. The concave depression/convex portion of each ridge 13 can be larger (in surface area, width and/or length) than any one of the openings 14. The ridges 13 and/or openings 14 can extend along 60% or more of the sidewalls 11, 12, e.g., can extend vertically on the sidewalls 11, 12 along a length that is 60%, 70%, 80% or more of a vertical height of the sidewalls 11, 12. The ridges 13 can form a substantial portion of each sidewall 11, 12, e.g., up to 50%, up to 40%, up to 30% or up to 20% of the surface area of a sidewall 11, 12.

Vertical extension of ridges 13 along the sidewalls 11, 12 can be useful when the press 1 is used with a cooking cavity 104 that has heating elements 108 that also extend vertically. In some embodiments, the ridges 13 on the press 1 can be positioned, sized, shaped or otherwise arranged to operate with a corresponding heating element 108 of a cooking cavity 104. For example, each ridge 13 can extend in a same direction and location as a corresponding heating element 108. This can allow the heating element 108 to provide heat more directly to the corresponding ridge 13, which can improve the food item heating process. This configuration can also allow a heating element 108 to move into at least a portion of a concave area defined by a ridge 13, e.g., due to thermal expansion of the heating element 108 during a cooking process. While heating elements 108 and ridges 13 are said to extend vertically in some embodiments, ridges on a press can extend in any suitable way which may correspond to a way in which heating elements extend in a cooking cavity that receives the press. For example, ridges can extend diagonally, horizontally and/or otherwise be configured to operate with a corresponding heating element.

In some embodiments, the sidewalls 11, 12 can be configured to mostly enclose the space where a food item is located. For example, the bottom ends of the first and second sidewalls 11, 12 can be configured to enclose the space between the first and second sidewalls at the bottom 16 of the press 1, e.g., by including bottom wall portions that extend toward an opposing sidewall at a bottom end of the sidewall. In some cases, the press 1 includes lateral end walls 15 attached to one or both of the first and second sidewalls 11, 12, e.g., that extend inwardly toward an opposing sidewall at a lateral side of the sidewall. The lateral end walls 15 can be configured to enclose the space between the first and second sidewalls 11, 12 at lateral ends of the space. By enclosing the space at lateral ends and/or the bottom and/or at the top, items in the space such as steam, grease, food particles, etc. can be contained within the press 1 and prevented or otherwise resisted from being deposited in the cooking cavity of a toaster or other cooking device.

Figure 7:
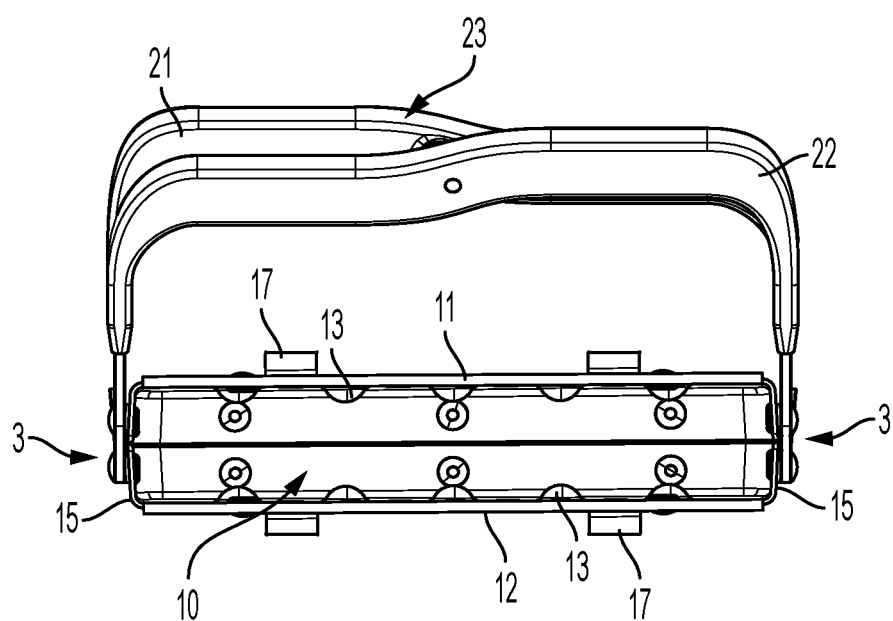
FIG. 7 is a top view of the FIG. 1 embodiment.

In some aspects of the disclosure, a sandwich press can include first and second sidewalls that are spaced apart from each other and define a space between the sidewalls to receive a food item, and a handle extending from the top end of the first or second sidewall. The handle can be configured to permit grasping by hand to manipulate the sandwich press at a location on the handle that is positioned between lateral ends of the sidewalls, above the space where the food item is received and offset from a region between planes of the first and second sidewalls. This arrangement can allow a portion of the handle that is gripped by a user to be positioned away from an area located directly over a cooking cavity of a toaster or other cooking device. This positioning of the gripping portion of the handle can provide benefits such as reducing heating of the gripping portion, e.g., by heated air rising from the cooking cavity, and/or allow easier viewing of the food item during the heating process. For example, FIGS. 6 and 7 show a handle 2 for the press 1 that has a gripping portion 23 which is positioned between the lateral ends of the sidewalls 11, 12 (e.g., between the lateral end walls 15—see FIG. 7), above the space between the sidewalls 11, 12 where the food item is received (see FIG. 6), and offset from a region between the planes of the first and second sidewalls 11, 12 (see FIG. 7). As a result, when the press 1 is placed in a vertical cavity of a toaster, for example, the gripping portion 23 of the handle 2 is positioned to the side of the cooking cavity and so that a user can view directly into the space between the sidewalls 11, 12 (e.g., as in FIG. 7). This positioning can also avoid locating the handle 2 at a front side of a toaster. As can be seen in FIG. 8, many toasters include a user interface 103 at a front side of the toaster 100 that allows a user to control operation of the toaster and/or receive status information regarding operation of the toaster. By positioning a handle 2 of the press 1 away from a front side of the toaster 100, a user can be free to view and/or interact with the user interface 103 without interference from the handle 2.

In some embodiments, the handle 2 includes first and second handle portions 21, 22 that form the handle 2 (e.g., where the first and second handle portions 21, 22 are respectively attached to the first and second sidewall 11, 12), but a single handle portion attached to only one sidewall can be employed. Two handle portions 21, 22 can allow for easy two-handed manipulation of the first and second sidewalls 11, 12, e.g., to move the sidewalls 11, 12 to the open and/or closed position, particularly if the sidewalls 11, 12 are hot from a previous cooking operation. For example, the handle portions 21, 22 can be grasped in a respective hand and separated from each other to move the sidewalls 11, 12 to the open (or closed) position as shown in FIG. 3. A hinge 4 connection at the bottom ends of the sidewalls 11, 12 can make the sidewall manipulation between open and closed positions relatively easy, e.g., because the sidewalls 11, 12 remain attached during movement, but is not required.

In some embodiments, the handle 2 can include a retainer to help hold the first and second sidewalls 11, 12 in the closed position. For example, as shown in FIG. 3, one or both handle portions 21, 22 can include a retainer 24 that can help hold the handle portions 21, 22 together (e.g., in the position shown in FIGS. 1 and 2), and thus the sidewalls 11, 12 in the closed position. The retainer 24 can include a latch, hook, clasp, strap, etc. and in some embodiments includes a magnet and magnetizable material that serve to hold the handle portions 21, 22 together. As an example, each of the handle portions 21, 22 can include a magnet at the gripping portion 23 that is arranged to engage and hold the handle portions 21, 22 adjacent each other. In embodiments where each of the handle portions 21, 22 are fixed to the first and second sidewalls 11, 12, respectively, the retainer 24 can provide suitable engagement to hold the sidewalls 11, 12 in the closed position. However, in some embodiments the press 1 can include additional structure such as a latch to hold the sidewalls 11, 12 in the closed position and the retainer 24 can be configured to simply hold the handle portions 21, 22 in a desired way relative to each other and/or can be configured to help keep the latch or other structure engaged.

In some embodiments, the press 1 can include a latch or other fastening arrangement to hold the first and second sidewalls 11, 12 in the closed position, and the latch or other fastening arrangement can be configured as part of the handle 2, or can be independent of the handle. In some embodiments, a sandwich press includes a cam latch having a first portion attached to the first sidewall and configured to force the first and second sidewalls to move to the closed position and compress the food item in the space in response to movement of the first portion relative to the first sidewall. In some cases, the cam latch can include a second portion attached to the second sidewall and configured to engage the first portion. For example, the second portion can include a catch and the first portion can include a lever having a distal end configured to engage the catch and force the first and second sidewalls to move to the closed position in response to movement of the first portion relative to the first sidewall. The first portion can be pivotally mounted to the first sidewall to force the first and second sidewalls to move to the closed position. In some cases, a retainer can be configured to hold the first and second portions stationary relative to each other when the first and second sidewalls are in the closed position. For example, the retainer can include a magnet mounted to the first or second portion and configured to exert force on the other of the first or second portion to hold the first and second portions stationary.

FIGS. 1 and 2 show an illustrative arrangement for a latch 3 configured to hold the sidewalls 11, 12 in a closed position. The latch 3 can include a lever 32 pivotally mounted to the first sidewall 11 at a pivot axis 33 so the lever 32 can be pivotally moved relative to the first sidewall 11. The latch 3 can also include catch 31 that is mounted to the second sidewall 12, or could be part of the second sidewall 12. The lever 32 and catch 31 can be configured to engage so that pivotal movement of the lever 32 about the pivot axis 33 forces the first and second sidewalls 11, 12 to the closed position. For example, a distal end of the lever 32 can be positioned in a J-shaped portion of the catch 31 and the lever 32 rotated so that interaction of the distal end of the lever 32 with the J-shaped portion of the catch 31 draws the first and second sidewalls 11, 12 together. A retainer can be used to hold the lever 32 and catch 31 relative to each other to hold the sidewalls 11, 12 in the closed position and as noted above, the retainer can be part of a handle 2 or can be included only as part of the latch 3. In this embodiment, the lever 32 and catch 31 are arranged as part of the first and second handle portions 21, 22, respectively, but can be configured as independent of the handle 2. That is, the second handle portion 22 can include the catch 31 and the first handle portion 21 can include the lever 32 and be pivotally mounted to the first sidewall 11 by a handle pivot 33. With this configuration, when the lever 32 is engaged with the catch 31 and the first and second handle portions 21, 22 are moved together (e.g., to be adjacent at the gripping portion 23), the catch 3 can operate to force the first and second sidewalls to move to the closed position with pivotal movement of the first handle portion relative to the first sidewall. The retainer 24 on the handle 2 can not only hold the handle portions 21, 22 relative to each other, but also keep the catch 3 engaged and hold the sidewalls 11, 12 in the closed position.

The handle 2 can be configured in any suitable way, and in some embodiments the first and second handle portions 21, 22 each have a U-shape with first and second legs and a central portion (e.g., defining at least part of the gripping portion 23) extending between the first and second legs. The first and second legs can be attached respectively to first and second lateral ends of a sidewall, e.g., the legs of the first handle portion 21 can be pivotally attached to the lateral ends of the first sidewall 11 and the legs of the second handle portion 22 can be fixed to the lateral ends of the second sidewall 12. The legs of the first handle portion 21 can include a lever 32 of the latch 3, and the legs of the second handle portion 22 can include a catch 31 of the latch 3.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A sandwich press configured for use with a toaster having a vertical cavity to receive and heat a food item and a plurality of heating elements associated with the vertical cavity, the sandwich press comprising:

first and second sidewalls each having a top end, a bottom end and lateral ends, inner sides of the first and second sidewalls being spaced apart from each other and defining a space between the inner sides to receive the food item, the inner sides of the first and second sidewalls having a flat section and a plurality of convex surfaces that extend inwardly from the flat section, the inner sides of the first and second sidewalls including only flat and convex surfaces and being free of any concave surfaces, the plurality of convex surfaces being entirely unperforated, elongated and extending along a majority of a height of the first and second sidewalls from the top end to the bottom end, the flat section of the first and second sidewalls including a plurality of openings that are elongated, are parallel to the convex surfaces, extend through the sidewall and extend along a majority of the height of the first and second sidewalls, outer sides of the first and second sidewalls respectively opposite the inner sides including an outer flat portion and a plurality of concave surfaces that each correspond to a respective one of the plurality of convex surfaces on the inner side, wherein the first and second sidewalls are coupled together and configured for insertion into the vertical cavity to heat the food item in the space between the first and second sidewalls.

2. The sandwich press of claim 1, wherein each of plurality of openings is positioned between adjacent ones of the plurality of convex surfaces.

3. The sandwich press of claim 1, wherein the first and second sidewalls are coupled together at the bottom ends.

4. The sandwich press of claim 3, wherein the bottom ends of the first and second sidewalls are configured to enclose the space between the first and second sidewalls at a bottom of the space.

5. The sandwich press of claim 4, further comprising lateral end walls attached to at least one of the first and second sidewalls, the lateral end walls configured to enclose the space between the first and second sidewalls at lateral ends of the space.

6. The sandwich press of claim 5, wherein the first and second sidewalls are configured to define an entrance opening to the space at a top of the space.

7. The sandwich press of claim 3, wherein the bottom ends of the first and second sidewalls are coupled together by a hinge configured to permit movement of the first and second sidewalls relative to each other between an open position and a closed position.

8. The sandwich press of claim 7, wherein the first and second sidewalls are configured to enclose the space at a bottom and lateral sides of the space when the first and second sidewalls are in the closed position.

9. The sandwich press of claim 7, further comprising a latch arranged to hold the first and second sidewalls in the closed position.

10. The sandwich press of claim 1, wherein the first and second sidewalls each have a stop extending outwardly from the top end configured to resist movement of the sandwich press into the vertical cavity beyond the stops.

11. The sandwich press of claim 1, wherein the plurality of openings are configured to permit steam emitted by the food item to escape the space, and the plurality of convex surfaces are configured to transfer heat by conduction to the food item and to receive at least a portion of a corresponding heating element into the concave shape.

12. The sandwich press of claim 1, further comprising a handle extending from the top end of the first or second sidewall, the handle including a gripping area configured to permit grasping by hand to manipulate the sandwich press that is positioned between the lateral ends, extends parallel to the first and second sidewalls, is positioned above the space and is offset from a region between planes of the first and second sidewalls.

13. The sandwich press of claim 12, wherein the bottom ends of the first and second sidewalls are coupled together by a hinge configured to permit movement of the first and second sidewalls relative to each other between an open position and a closed position, and wherein the handle includes a first portion coupled to the first sidewall and a second portion coupled to the second sidewall, the first portion is movably mounted to the first sidewall and configured to engage with the second portion to hold the first and second sidewalls in the closed position.

14. The sandwich press of claim 1, wherein a surface area of each of the plurality of convex surfaces is larger than an area of any opening in the first or second sidewall.

15. The sandwich press of claim 1, wherein the plurality of openings define an open area of the first and second sidewalls, and wherein a ratio of the open area to a closed area of the first and second sidewalls is between zero and 40%.

16. The sandwich press of claim 1, wherein the plurality of convex surfaces each have a length in a first direction and a width in a second direction perpendicular to the first direction, the plurality of convex surfaces each having a semi-circular or elliptical shape in cross section along the second direction and the length being larger than the width.

17. The sandwich press of claim 1, wherein the plurality of convex surfaces are each configured to transfer a greater amount of heat or transmit heat at a faster rate or spread heat delivery over a larger surface area to the space and the food item than a flat sidewall surface located in a same location as the ridge.

18. The sandwich press of claim 1, wherein each of the plurality of convex surfaces extends inwardly from the inner side of the respective first or second sidewall by a distance that is greater than a thickness of the sidewall.

19. The sandwich press of claim 1, wherein each of the plurality of convex surfaces on the inner side of the first sidewall is directly opposed to a corresponding one of the plurality of convex surfaces on the inner side of the second sidewall.

20. A method for heating a food item held by a sandwich press configured for use with a toaster having a vertical cavity to receive and heat the food item and a plurality of heating elements associated with the vertical cavity, the method comprising:

compressing the food item in a space between inner sides of first and second sidewalls each having a top end, a bottom end and lateral ends, the inner sides of the first and second sidewalls having a flat section and a plurality of convex surfaces that extend inwardly from the flat section and contact the food item, the inner sides of the first and second sidewalls including only flat and convex surfaces and being free of any concave surfaces, the plurality of convex surfaces being entirely unperforated, elongated and extending along a majority of a height of the first and second sidewalls from the top end to the bottom end, the flat section of the first and second sidewalls including a plurality of openings that are elongated, are parallel to the convex surfaces, extend through the sidewall and extend along a majority of the height of the first and second sidewalls, outer sides of the first and second sidewalls opposite the inner side including an outer flat portion and a plurality of concave surfaces that each correspond to a respective one of the plurality of convex surfaces on the inner side;

inserting the first and second sidewalls and the food item into the vertical cavity of the toaster to heat the food item in the space between the first and second sidewalls; and conducting heat from the plurality of heating elements from the plurality of concave surfaces at the outer sides of the first and second sidewalls to the plurality of convex surfaces in contact with the food item at the inner sides of the first and second sidewalls.

* * * * *